Figure 1:
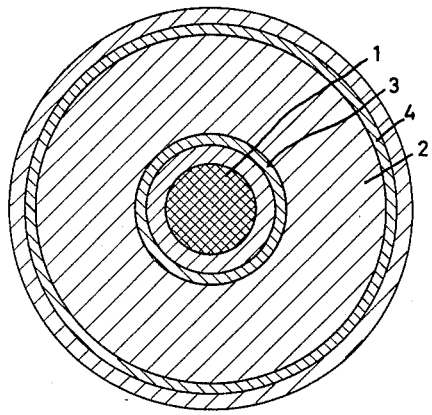

Oct. 19, 1965    E. FITZER ETAL    3,212,989

NUCLEAR FUEL ELEMENT WITH CARBON JACKET

Filed March 19, 1962    3 Sheets-Sheet 1

Oct. 19, 1965  E. FITZER ETAL  3,212,989
NUCLEAR FUEL ELEMENT WITH CARBON JACKET
Filed March 19, 1962  3 Sheets-Sheet 2

3,212,989
NUCLEAR FUEL ELEMENT WITH CARBON JACKET

Erich Fitzer, Augsburg, and Otto Vohler, Nordendorf, Germany, assignors to Siemens-Planiawerke Aktiengesellschaft für Kohlefabrikate, Meitingen, Germany, a corporation of Germany
Filed Mar. 19, 1962, Ser. No. 181,503
Claims priority, application Germany, Mar. 21, 1961, S 73,080
25 Claims. (Cl. 176—71)

Our invention relates to nuclear fuel elements jacketed in graphite, particularly for use in high-temperature reactors.

It is known to enclose fuel elements within a dense jacket or sleeve to keep radioactive fission products away from the coolant. All metallic cladding materials heretofore used for such purposes are limited to relatively low temperatures. Therefore, fuel elements for use in high-temperature reactors, operating with coolant exit temperatures above 500° C., preferably above 700° C., have been enclosed in graphite.

Graphite, however, is no longer impermeable to fission products at temperatures above 500° C. It has therefore been proposed to employ reactor designs operating with a radioactive coolant circulation. One of these proposals provides for graphite jackets particularly well permeable to fission products. According to another proposal an intermediate gas flow is to be employed which separately eliminates the fission products passing through the permeable graphite jacket and which keeps these products away from the coolant gas circulation proper by means of an envelope of highly impermeable graphite. No practical experience with such a system is available. However, the intricacies of such double circulation and the infeasibility of effectively shielding the gas circulation from the active fission products is obvious.

It is an object of our invention to provide jacketed nuclear fuel elements which afford an improved degree of impermeability to fission products at high temperatures, particularly above 500° C., without requirement for complicated cooling systems.

Another object of the invention, subsidiary to the one mentioned, is to afford readily adapting the jacketed element, as regards materials and structure, to a great variety of different requirements as may be encountered with virtually any reactor system or type of nuclear fuel bodies.

According to our invention, a nuclear fuel element is provided with a fission-product retaining jacket of graphitic carbon which comprises at least two sealing zones which are independently effective as regards sealing action but are in thermally conductive connection with each other and which contain elemental carbon as sealing agent. The thickness of each individual sealing zone in such a jacket may be made extremely small, for example about 0.01 mm.; or it may be given a larger dimension, for example about 20 to 30 mm. Generally, thickness values within the C-range of 0.01 mm. to 30 mm. are applicable.

In a nuclear-fuel carbon jacket with a plurality of sealing zones according to the invention, the joint effect of these zones goes remarkably beyond what can be expected from employing a single zone of correspondingly increased thickness. A single jacket zone immediately adjacent to the nuclear fuel is endangered by the destructive action of the occurring fission products themselves. An outer zone is subject to frictional wear, burning-off by the coolant and other extraneous effects. The subdivision of the sealing zone, however, affords adapting each component zone to the specific stresses occurring at its particular location and, in many cases, is the only possible way of producing particularly effective sealing layers or zones. This applies, for example, to pyrographite layers deposited from the gaseous phase, when these are placed on both sides of a curved graphite body and are to have optimal thickness on each side. An individual layer of twice the optimal thickness would not at all be producible on account of the mechanism of growth involved in the pyrolytic production of such layers. It is known as such to form a sealing zone in graphite. Such zones can be produced by impregnating the graphite body with carbonizable or coke-forming substances in liquid form and subsequently dissociating the substance thermally. Another way is to segregate and precipitate carbon from the gaseous phase.

According to a preferred feature of our invention, at least one of the sealing strata in the carbon jacket of the nuclear fuel element consists of pyrolytic carbon. This type of dense carbon is obtained by passing a hydrocarbon gas over the carbon surface to be sealed while maintaining a surface temperature above 700° C., preferably above 1000° C., under conditions at which the rate of crystallization of the precipitating carbon is greater than the dissociation rate of carbon at the carbon surface. Such sealing layers have permeabilities of $10^{-8}$ to $10^{-10}$ cm.$^2$/sec. The maximal layer thicknesses are between about 0.01 mm. to about 10 mm., depending upon the precipitation conditions and the curvature radius of the substratum.

According to another feature of our invention, at least one of the sealing zones in the nuclear-fuel jacket consists of graphite or other carbon body sealing by liquid impregnation. A sufficient sealing, up to an ultimate permeability for nitrogen at $1 \cdot 10^{-6}$ cm.$^2$/sec., cannot be obtained by a single impregnation but requires multiple repetition of the impregnating step. Depending upon the porosity and the size of the fine grain in the starting material, three to six impregnating steps are usually needed, and the viscosity of the impregnating medium, as a rule, must be decreased with progressing degree of sealing. For the last sealing steps, an impregnating liquid having a viscosity smaller than 5 cp. (centipoise), preferably smaller than 2 cp., should be used. The impregnating agents used for the first steps of the process are preferably chosen in accordance with the pore radius. With average pore radii of about $4\mu$ (microns), these impregnating agents, used for the first few impregnating steps, may have a viscosity of 100 to 300 cp.

We have found that it is of advantage to perform the first impregnation with a liquid impregnating agent that becomes solid prior to coking. Preferably used are synthetic resins which greatly shrink during coking, such as furan derivatives, for example a furfural-acrolein condensation product or a phenol-aldehyde condensation product. As a result, the big pores become subdivided in the first coking step. According to the invention, meltable hydrocarbons have been found well suitable for the second and/or the third impregnating step. The last impregnating steps are preferably effected with condensable low-viscosity resins.

According to another feature of our invention, we provide the carbon jacket of the fuel element with a porous zone which effects the permeation of the gaseous or vaporous fission products. Such a porous zone is arranged at least on one side of the inner sealing zone. At first glance, the interposition of a porous zone may appear contradictory to the purpose of the invention, i.e. to improve impermeability. However, the effectiveness of a porous stratum in the graphite jacket material, although highly impermeable as whole, can be explained as follows.

As far as permeability is concerned, the existence of a pore space (back-up space) is insignificant. However, for employment of such impermeable or slightly permeable graphites as jacket or envelope material of nuclear fuel elements, the pore space assumes increased significance. The jacket material serves to prevent radioactive, gaseous fission products from the nuclear fuel from entering into the flow of coolant gas. Otherwise the coolant would become radioactive. This purpose, however, cannot be satisfied in perfection. In practice, the ingress of fission products into the coolant circulation can only be reduced by delay. The fission products have decaying periods or half-lives in the order of minutes to hours. Hence, the minimum aimed at is to detain the gaseous fission products as long as possible in the jacket material so that their radioactivity is greatly decreased when they emerge out of the jacket material. The minimum requirement, as a rule, is a delaying period of about one hour. More desirable delaying periods are up to about ten hours. Thus, for example, the xenon isotope 135 has a half-life of 9.2 hours, the krypton isotope 85 a half-life of 4.5 hours; krypton 87 has a half-life of 1.3 hours, and krypton 88 a half-life of 2.4 hours.

The dwell time of gaseous fission products in a layer thickness of 1 cm. is defined by the ratio of pore volume to permeability. This will readily be understood on the basis of Fick's law which represents the relation between the diffusion or permeability coefficient of a mass of a definable medium passing through a defined cross section with a given diffusion gradient. Fick's law can also be expressed by stating that the gas volume which diffuses per unit of time is proportional to the permeability coefficient K, for a cross-section area 1 and a concentration gradient 1. The traversing or delaying time ($\Delta t$) results therefrom as the ratio of the gas volume ($\Delta V$) contained in the pores to the permeability coefficient K:

$$\Delta t = \frac{\Delta V}{K}$$

The above-mentioned sealing of graphite is due to precipitation of carbon in the pores. This is accompanied by partial filling of the pores and consequently by a reduction in total porosity. In any event, the reduction in permeability is always accompanied by a reduction in pore volume. However, in order to obtain a long traversing time (delaying time for the fission products passing through the jacket) a large pore volume at low permeability is required in accordance with the foregoing equation. Apparently, this requirement cannot be met by the sealing methods heretofore employed. However, the requirement is readily realizable in accordance with the present invention by means of at least two different and independently sealing strata. Thus, for example, the required pore volume can be placed between the two sealing strata into the heat-conducting graphite connection between the zones.

Preferably the porosity of the porous zone is such that the bridges formed by the carbon structure have a thickness approximately equal to the pore diameter and the individual pores, aside from the sealed pore necks, are less than 0.1 mm., preferably below 0.01 mm. in all directions. The inner portion or surface region of the porous zone preferably consists of carbon material whose specific gravity or volumetric weight is less than 2.0 g./cm.$^3$.

For the purposes of the invention, the pore space may also be located ahead of the sealing zones. For example, the pore space may be located in the interior of the nuclear fuel element in form of an unsealed stratum, called "back-up space," which, seen from the interior, precedes the sealing zones. This has the following particular advantage.

An entirely perfect seal can never be attained. There always remain a few residual pores that extend through the jacket and constitute connecting channels responsible for diffusion through the jacket. If the two sealing zones are placed directly above each other and if they are firmly connected with each other, for example by depositing a pyrographite layer (layer $a$) upon an impregnated graphite layer (layer $b$), then the probability that the few through-pores in layers $a$ and $b$ will just register with each other, is extremely slight. In this respect the provision of a plurality of sealing layers achieves a considerably better result than possible with a single layer of equivalent thickness.

The invention can be given a large number of different embodiments of which only a few are illustrated by way of example on the accompanying drawings. The embodiments chosen for illustration are essentially of fundamental nature and, for simplicity, are generally limited to the minimum of two sealing zones and to one or two porous zones, although any desired greater number of such strata can be provided.

FIGS. 1 through 10 of the drawings show schematically and in cross section ten different carbon-jacketed nuclear fuel elements according to the invention, the same reference numerals being employed in all illustrations for respectively corresponding components.

According to FIG. 1, the nuclear-fuel core 1 is surrounded by a jacket of graphite denoted as a whole by 2. The graphite jacket 2 is provided with two sealing zones, namely an inner sealing zone 3 and an outer sealing zone 4. While fuel cores, jackets and zones of circular cross section are shown, it will be understood that the invention is not limited to cylindrical or spherical fuel elements but is analogously applicable to fuel elements and jackets of any other suitable shapes.

As explained above, a stratified carbon-jacketed fuel element according to our invention, having at least two sealing zones or layers in the jacket that act independently of each other but are in thermally conducting connection with each other through carbon, may be composed particularly of the following fundamental elements:

Element Group I: fuel material not sealed.
Element Group II: fuel with first sealing envelope.
Element Group III: first fuel-free sealing envelope.
Element Group IV: second fuel-free sealing envelope.

These individual groups of elements will now be more specifically described as regards suitable compositions of material.

To Group I:
(1) A fuel core, for example uranium carbide ($UC_2$) granules.
(2) A multiplicity of fuel granules, for example uranium carbide granules joined with each other by a porous coke or cementing structure, so as to form a fuel pellet or fuel rod; or a loosely poured mass of uranium-carbide granules.

To Group II:
(3) Individual grains of uranium carbide according to Item 1 but enveloped by a gas-tight pyrographite coating densely grown upon the grains.
(4) Uranium-carbide granules sealed by liquid impregnation, i.e. enveloped by a coked resin film which is produced by several subsequent steps of impregnation and coking to form a dense carbon enclosure. Among these materials is a mixture of granules of this kind, also a pressed body which is composed of pure uranium-carbide granules bonded together by the realing mass of coked resin and which, for sealing, has been repeatedly impregnated and ultimately coked or graphitized.
(5) A fuel pellet consisting of uranium carbide and graphite (for example U:C=1:45) surrounded by a dense coating of pyrographite.
(6) A fuel pellet of uranium carbide and carbon, impregnated and sealed with the aid of the liquid impregnation.

To Group III:
(7) A thin-walled (about 1–5 mm.) graphite or other carbon body, sealed by multiple impregnation; for example a natural graphite cup or a small ball of natural graphite densified and sealed by multiple impregnation and coking; or an electrographite capsule to serve as a small fuel box, (8) A material according to Item 7, for example a fuel box, cup or ball of graphite, but sealed with pyrolytic graphite either at the inner layer or outer layer.

To Group IV:

(9) A graphite body, for example a fuel box or fuel ball, impregnated throughout or impregnated at a marginal zone. This fuel jacket need not be spherical. It may also be cylindrical, rod-shaped or prismatic. Quadrangular or elliptic cross-sectional shapes are applicable.

(10) Material according to Item 9, however with a marginal-zone seal produced from the gaseous phase. Applicable is an electrographite body coated with pyrolytic graphite.

(11) A pure pyrographite shell to constitute the last layer. The shell may be composed of half shells.

In accordance with the above-presented grouping and sub-grouping, a carbon-jacketed fuel element according to our invention may correspond to any of the combinations briefly described in the following.

The possibilities of combining two of the listed item materials in the proper manner are apparent from the following tabulation. Further combinations result, for example, by combining the fuel cores of Group II, having a sealing envelope, with sealing jackets of Group III and/or IV, thus employing three or more independently acting sealing zones that are thermally in conductive connection with each other by intermediate carbon.

TABLE

| Unprotected fuel core according to Group I | Jacket | |
|---|---|---|
| | With first sealing zone according to Group III | With second sealing zone according to Group IV |
| Item 1 or 2 | Item 7 | Item, 9, 10 or 11. |
| | Item 8 | Item 9 or 10. |

| Core with first sealing zone according to Group II | Jacket with second sealing zone according to Groups III and IV |
|---|---|
| Item 3 | Item 7, 8, 9 or 10. |
| Item 4 | Item 8, 10 or 11. |
| Item 5 | Item 7, 8, 9 or 10. |
| Item 6 | Item 8, 10 or 11. |

FIGS. 2 to 10 illustrate some of the tabulated core-and-jacket combinations and will be briefly described presently.

Figure 2:
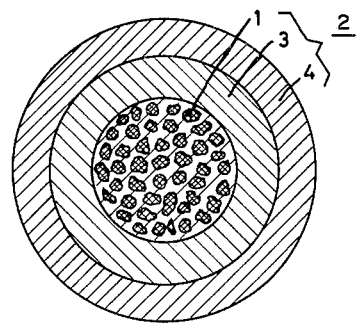

FIG. 2.—The fuel core 1 consists of $UC_2$. The graphite jacket 2 has a first sealing zone 3 of coked synthetic resin film, and a second sealing zone 4 of pyrographite.

Figure 3:
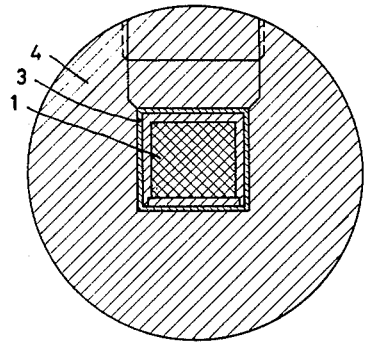

FIG. 3.—The fuel core 1 of $UC_2$ is enclosed in a capsule with a pyrographite jacket 3 and a second jacket 4 of graphite sealed by liquid impregnation. A stopper or screw plug 4a permits inserting the capsule.

Figure 4:
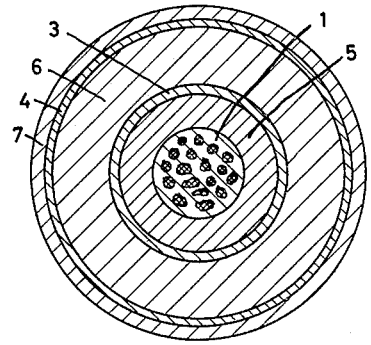

FIG. 4.—This figure illustrates the general case of a fuel core 1, here consisting of $UC_2$ granules and graphite, with a graphite jacket having two sealing zones 3 and 4, two porous zones 5, 6 and an external jacket 7.

Figure 5:
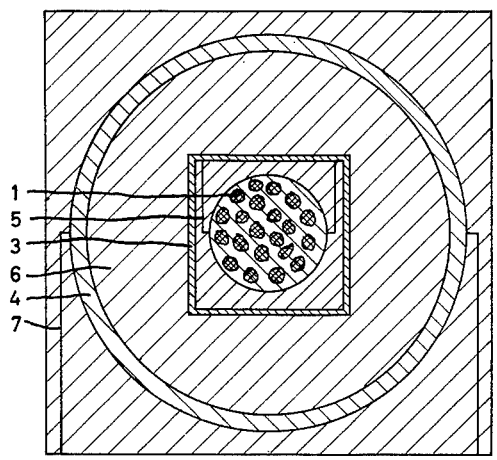

FIG. 5.—The fuel core 1, consisting of $UC_2$, is pressed together with graphite in a cup 5. The core-and-cup assembly is surrounded by an inner sealing layer 3 of pyrographite. An outer sealing zone 4 is produced from the gaseous phase. An outer porous zone 6 of graphite is located between the two sealing zones 3 and 4. The entire assembly is enclosed in an external jacket structure of electrographite composed of two parts 7 and 7a.

Figure 6:
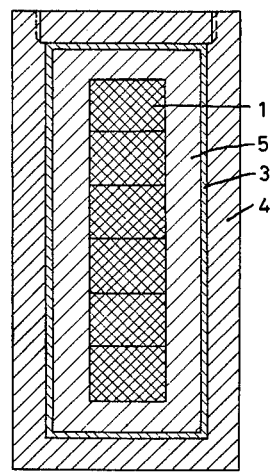

FIG. 6.—A rod-shaped fuel core 1 is composed of $UC_2$ tablets in a capsule 5 which forms an inner porous zone and is provided with a pyrographite envelope zone 3 surrounded by a fuel box 4 sealed by liquid impregnation.

Figure 7:
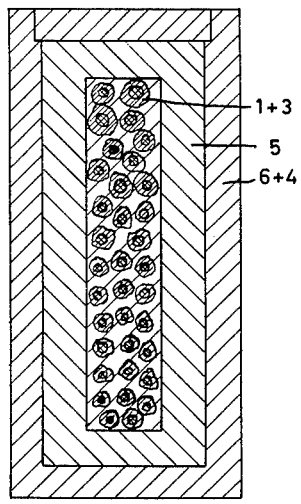

FIG. 7.—A rod-shaped fuel core 1 consists of $UC_2$ granules directly sealed by pyrolytic carbon 3 and pressed together with graphite. This composite fuel core is surrounded by a capsule 5 of pourous electrographite located in a fuel box 6+4 sealed in a marginal zone by gas impregnation.

Figure 8:
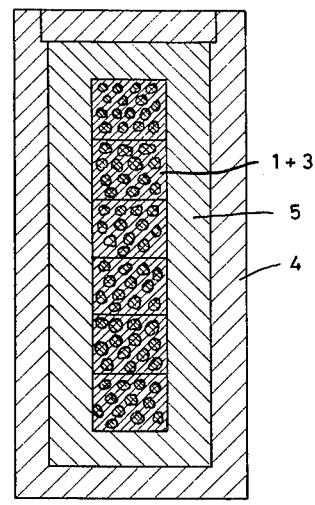

FIG. 8.—A rod-shaped fuel core 1+3 is composed of homogeneous graphite-bonded $UC_2$ tablets and sealed by liquid impregnation. The fuel core is surrounded by a porous graphite capsule 5 located in a fuel box 4 sealed by liquid impregnation.

Figure 9:
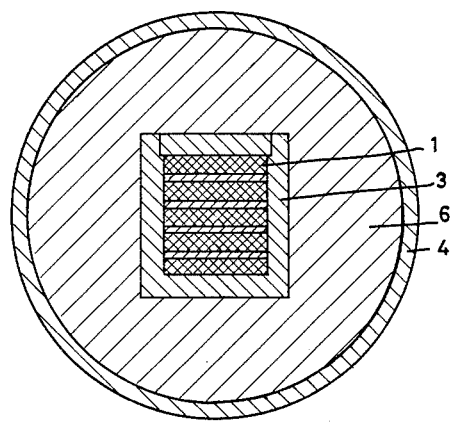

FIG. 9.—A fuel core 1 consists of alternate strata of $UC_2$ and graphite tablets in a closed cup 3 sealed by liquid impregnation. The cup 3 is located in a spherical graphite jacket 6 sealed in an external pyrographite zone 4.

Figure 10:
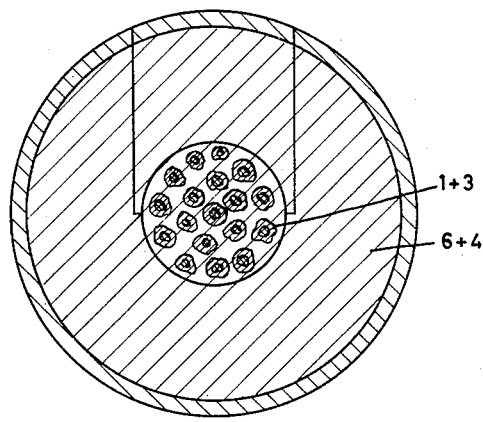

FIG. 10.—A spherical fuel core 1+3 of $UC_2$ granules is sealed with pyrographite and pressed together with graphite. The spherical core is enclosed in a spherical jacket 6+4 which has a marginal zone sealed by liquid impregnation.

The production and properties of carbon jacketed nuclear fuel elements according to the invention will be described presently with reference to the following examples.

*Example 1*

This example constitutes a combination of the above-mentioned materials according to Items 3 and 8. The productions is as follows:

Uranium carbide granules of 50 to 400μ grain size (obtainable from Minnesota Mining & Mfg. Co.) are coated with pyrographite of 10 to 30μ. This is done either in a flow bed arrangement or in equipment similar to a rotary kiln. For examples, the desired thickness of the pyrographite coating can be produced by subjecting the fuel granules at 1300° C. for one hour to a gaseous mixture of 2 to 3 volumetric percent of propane in nitrogen completely free of oxygen and hydrogen but containing an addition of about 0.5 vol. percent benzol. The resulting pyrographite-coated fuel granules are pressed together with the readily compressible and deformable graphite granules to obtain cylindrical rod or plate-shaped bodies. Preferably used for this purpose is coarse crystalline Flinzgraphite because this material permits being pressed and shaped together with the hard-coated carbide granules without requiring any binding medium that may liberate gases. The pressing is done in vacuum. Up to 30% by weight of such granules can be embedded in natural graphite. If it is necessary to employ a higher content of coated fuel granules, slight amounts of binding agents may be added, for example pitches, phenol-formaldehyde resins, furan resins or similar substances. This, however, requires subsequent firing of the pressed body for gas elimination.

The pressed and shaped bodies thus obtained are placed into a previously prepared and pre-machined graphite body which may consist of electrographite or of bonded, coked or graphitized natural graphite. It is essential that the graphite body have highest feasible pore volume. Best suited are so-called porous graphite bodies that can be produced with a volumetric weight (specific gravity) of about 1.3 to 1.4 g./cm.$^3$ but which are so fine-porous that the sealing layer adheres firmly without clogging the interior of the pores. Average volumetric weights of such enveloping bodies having a sufficient strength, are usually at about 1.5 to 1.6 g./cm.$^3$. Essential requirements for these shaped bodies are the very fine granulation and the fine pores. The pores, measusrable by the known mercury method, must have a maximum at about 4μ. It is preferable to employ graphite bodies having pores below 1μ, preferably below 0.6μ. Such bodies can be produced, for example, by making them only from materials of less than 0.1 mm. grain size, namely materials usually called "dust" in carbon techniques. It has been found that earthy natural graphites in purified form are likewise suitable. They result in volumetric weights of about 1.5 g./cm.$^3$ in spite of their extremely fine grain size. Bodies with a volumetric weight of 1.4 to 1.5 g./cm.³ can also be produced by extrusion from electrographite dust material.

For the purposes of the invention, the envelope body just described, regardless of whether it is of spherical, plate, capsule or cylindrical shape, must be provided with an outer sealing zone or layer of pyrographite. This layer can be produced on the body in vacuum or protective gas by subjecting the body to pyrolysis. The lower the pyrolytic gas temperature, the finer is the grain of the resulting pyrographite coating. Fine-grained coatings have been found to have better adherence but a very slow rate of growth. When operating at 1000° C. in vacuum under a partial pressure of 0.2 mm. Hg hydrocarbon, the growth amounts to about 10 to 20μ in about 10 days. The outer layer or zone then has a permeability of $K=10^{-9}$ to $10^{-10}$ cm.²·sec.⁻¹ relative to the layer thickness. With respect to the thickness of the fundamental body of graphite that protects the fuel enclosure, the over-all permeability is approximately $10^{-6}$ cm.²/sec.

It has been found advantageous to place upon this pyrographite layer a sleeve of soft but resistant electrographite in order to protect the outer sealing zone from chemical or mechanical damage from the outside. This outer sleeve or jacket may consist of porous electrographite, or electrographite of relatively few pores as resulting from liquid impregnation. This corresponds to the sealing structure according to Item 9 or 10 of the foregoing listing.

*Example 2*

A fuel tablet consisting of a mixture of uranium carbide and graphite (U:C in a ratio of 1:30 to 1:50) is produced by pressing uranium oxide together with natural graphite. The pressed tablet is sintered in vacuum to liberate CO and convert to uranium carbide mixed with residual graphite. Such a fuel tablet is then coated according to the invention with pyrolytic graphite. The minimum production temperature for this purpose is about 1000° C. The maximum temperature up to which an excessive melting of the uranium carbide is still prevented, is about 2300° C. The pyrographite layer thus produced is given a thickness of about 0.1 to 1 mm. It is particularly advisable to give the fuel body a spherical or rounded shape because this reliably secures adhesion of the pyrographite coating on all sides, whereas otherwise the coating may scale off at sharp corners. The graphite coating is alone sufficient to obtain a sealing up to an impermeability of $10^{-6}$ to $10^{-7}$ mm.²/sec.⁻¹.

The fuel core thus sealed according to Item 5 of the foregoing listing, is then placed into a cylindrical cup according to Item 7. The cup has external cylindrical shape and has internally a semispherical bottom with a semispherically recessed stopper (5 in FIG. 5). The cup may consist of normal electrographite having a volumetric weight of 1.7 g./cm.³ and a permeability of $10^{\circ}$ cm.²/sec. However, for achieving additional effects, the cup may already be given a reduced permeability down to $10^{-5}$ to $10^{-6}$ by means of liquid impregnation. Preferably, the liquid impregnation is coked at only 1000° C. It then deposits in the pores an active carbon of increased absorption for the occurring fission products. It is important that such fission products be bonded in the graphtie. The more active the graphite, i.e. the more it tends to enter into reaction with other elements so as to form absorption compounds or real chemical compounds such as carbides, the better is the retaining capacity of the graphite body relative to fission products.

The encapsulated fuel core thus obtained is inserted into a spherical body of graphite (7 in FIG. 5) which constitutes the external jacket. Depending upon whether the internal capsule (3 in FIG. 5) is sealed or not, the outer jacket need not be sealed or must be sealed. When using sealed jackets, it is preferable to employ an impregnation extending throughout the jacket. In this manner a volumetric weight of 1.95 g./cm.³ and a permeability of $10^{-6}$ of the graphite can be obtained. In this case, too, sealing by amorphous filling of the pores is generally preferable to graphitized filling.

*Example 3*

Used as starting material is a fuel structure in form of a pressed or bonded shaped body consisting of uranium carbide and carbon. This body may be formed directly from carbide granules, or it may be produced from uranium oxide by reaction with an excessive amount of carbon. The shaped body is impregnated with hydrocarbon liquid and then subjected to coking in order to become sealed. The outer skin of the liquid impregnation is not removed. In this manner, a shaped body of graphite is obtained containing pure carbon with carbide granules throughout which is sealed toward the outside. This body can be given cylindrical, plate or spherical shape. It is fitted into a normal electrographite body so that it is in intimate contact therewith on all sides in order to secure good heat conductance. The electrographite body is thereafter coated with a thick layer of pyrographite having a thickness of up to 5 mm. The resulting body, in effect, constitutes a structure of pyrographite.

*Example 4*

Uranium carbide filaments of 20μ diameter are coated with pyrographite layers of 5 to 10μ thickness and are bunched to form a green mass which is then pressed to a wick. The wick is surrounded with a graphite mass free of uranium carbide and is fired together with the mass at a temperature up to 2000° C., thus being graphitized. The resulting rod is subsequently coated with pyrolytic carbon. The graphite content in the green mass secures a suitable thermal conductance.

*Example 5*

Uranium carbide granules with coating are used as core of a homogeneous sphere. The spherical body is subsequently impregnated and treated as described above.

The particular design of the fuel element, the particular combination of materials and the best suitable production method are chosen in each case in dependence upon the requirements and desiderata of the intended application. However, the following directives will facilitate a proper selection.

(1) In general, a pyrographite seal should not be used as an outer zone if it is limited to a small layer thickness because otherwise the danger of becoming damaged is too great.

(2) A thick zone or layer of pyrographite should not be given too much curvature because then the thermal tension may become too great.

(3) Due to thermal tension, care should be taken that the outermost graphite jacket or zone is as insensitive as feasible to thermal shrinking tensions by being somewhat movable in itself. For that reason the outermost graphite zone of the jacket preferably consists of electrographite.

(4) Directly enveloping the nuclear fuel grains entails the danger that the occurring fission products, on account of their kinetic energy, may completely destroy the structural material within an action distance of up to 10μ. Such destruction should always be taken into account. For that reason it is preferable to place the inner sealing zone, if possible, not in direct contact with the nuclear fuel material, or the layer thickness of the inner sealing zone must be made larger than the destruction distance, i.e. larger than 10 microns. Preferably the zone thickness should be at least about 15μ. This permits direct enveloping of the nuclear fuel by pyrographite.

(5) The largest feasible back-up or pore space between the sealing zones should be provided. This is best obtained by means of a porous graphite or electrographite.

If an external pyrographite layer is to be avoided and a back-up space is to be disposed behind the outer sealing zone, the outer zone is preferably made of electrographite and sealed either by liquid impregnation or by a pyrographite coating on its inner side. Pyrographite is particularly advantageous because, as a rule, it affords the best sealing effect for a given layer thickness. On the innermost side of the jacket an unsealed graphite is preferably used, close to the nuclear fuel but still sufficiently spaced therefrom to avoid destruction by the fission products.

We claim:

1. A nuclear fuel element comprising fissionable core material and jacket means consisting throughout of graphitic carbon surrounding said core material and intimately joined therewith for retaining fission products, said jacket means having at least two independent sealing zones around said core material and around one another, said sealing zones being in thermally conductive connection with each other and containing elemental carbon as sealing agent.

2. A nuclear fuel element comprising fissionable core material and jacket means of graphitic carbon surrounding said core material and intimately joined therewith for retaining fission products, said jacket means having a plurality of sealing zones surrounding said core material and one another, said sealing zones being in thermally conductive connection with one another and containing elemental carbon as sealing agent, at least one of said zones consisting of pyrolytic carbon.

3. A nuclear fuel element comprising a fissionable core material and jacket means of graphitic carbon intimately joined with said core material for retaining fission products, said jacket means having a plurality of sealing zones surrounding said core material and one another, said sealing zones being in thermally conductive connection with one another and containing elemental carbon as sealing agent, at least one of said zones consisting of originally porous carbon with a pore-sealing substance formed of a carbonizable material impregnated into said porous carbon in liquid form and thermally disassociated to carbonize it after the impregnation.

4. A nuclear fuel element comprising a fissionable core material and jacket means of graphitic carbon intimately joined with said core material for retaining fission products, said jacket means having a plurality of sealing zones surrounding said core material and one another, said zones containing elemental carbon as sealing agent and being in thermally conductive connection with each other, and a porous graphite zone on at least one side of the innermost sealing zone, said porous zone being permeable to gaseous fission products.

5. In a nuclear fuel element according to claim 4, said porous zone forming an envelope perimetrically closed about said core material.

6. In a nuclear fuel element according to claim 4, said porous zone surrounding said core and having a carbon structure whose bridge portions between pores are of a thickness approximately equal to the pore diameter, the individual pores of said carbon structure being in all directions less than 0.1 mm., preferably less than 0.01 mm.

7. In a nuclear fuel element according to claim 4, said porous zone having an inner portion consisting of highly absorptive carbon having a volumetric weight below 2.0 g./cm.$^3$.

8. In a nuclear fuel element according to claim 1, the innermost one of said sealing zones having a sealingly active portion spaced at least 10 microns from said core material.

9. In a nuclear fuel element according to claim 1, the outer one of said sealing zones being spaced at least 1 mm. from said core material.

10. In a nuclear fuel element according to claim 4, said two sealing zones being in contact with each other, and said porous zone being located inside the innermost sealing zone.

11. In a nuclear fuel element according to claim 1, said core material forming part of a fuel-containing shaped body, and the inner one of said sealing zones having a minimum thickness of 10 microns and forming a coating on said shaped body.

12. In a nuclear fuel element according to claim 1, said core material consisting of fuel particles, pure carbon mixed with said fuel particles and forming together therewith a shaped core body, the inner one of said sealing zones being disposed upon said core body and joined therewith.

13. In a nuclear fuel element according to claim 1, said core material forming a shaped body consisting of nuclear fuel particles proper and heat-conducting graphite particles bonding the fuel particles together.

14. In a nuclear fuel element according to claim 1, one of said sealing zones consisting of a coked layer of a synthetic resin film, resulting from repetitive deposition and coking.

15. In a nuclear fuel element according to claim 1, the inner sealing zone consisting substantially of a thin-walled envelope structure of 1 to 5 mm. wall thickness formed of fine-granular graphite densified and sealed by multiple impregnation with a carbonizable liquid resin thermally treated to carbonize it after the impregnation.

16. In a nuclear fuel element according to claim 1, at least one of said sealing zones consisting of a component stratum of pyrolytic carbon and a component stratum of a mass of graphitic coked resin impregnated in liquid form into said pyrolytic carbon and subsequently thermally carbonized.

17. In a nuclear fuel element according to claim 1, the outer one of said sealing zones consisting of a shaped body of artificial graphite partially impregnated with a carbonizable resin coked subsequent to the impregnation.

18. In a nuclear fuel element according to claim 1, the outer sealing zone consisting of a pyrographite shell having at least 1 mm. thickness.

19. A nuclear fuel element comprising a jacket structure of artificial graphite, core material enclosed in said jacket structure and consisting of uranium-carbide particles and carbon particles, said carbide particles being coated with dense pyrolytic carbon thus being individually sealed, and said jacket structure having a sealing zone at least at its surface.

20. In a nuclear fuel element according to claim 1, said core material comprising rod-shaped fuel particles.

21. In a nuclear fuel element according to claim 1, said jacket means forming a structure of spherical overall shape.

22. In a nuclear fuel element according to claim 1, said jacket means being rod-shaped.

23. A nuclear fuel element comprising pressed and shaped core bodies of fuel particles coated with pyrolytic carbon in mixture with coarsely crystalline graphite powder, a graphite jacket structure into which said core bodies are inserted, said jacket structure having at least one dense sealing stratum and a porous zone between said stratum and said coated core bodies.

24. A nuclear fuel element comprising fissionable core material and jacket means intimately joined with said core material for retaining fission products, said jacket means consisting of highly porous and finely pored graphite having a volumetric weight of 1.3 to 1.4 g./cm.$^3$, and said jacket means comprising at least one sealing zone surrounding said core material in spaced relation thereto, the pores in said sealing zone containing a coked carbonizable resin impregnated into said pores.

25. A nuclear fuel element comprising a fuel core containing uranium and carbon, said fuel core having a sealing zone formed of coked impregnation, a jacket body of electrographite, said sealed core being inserted in said jacket body and said jacket body having a closure covering said core, and a surface zone of a coked carbonizable resin impregnated into and filling and sealing the pores of said jacket body and closure as well as the gaps between jacket and closure.

References Cited by the Examiner

UNITED STATES PATENTS

| | | | |
|---|---|---|---|
| 2,927,071 | 3/60 | Huey | 176—79 |
| 3,018,238 | 1/62 | Layer et al. | 29—470.-1 |

FOREIGN PATENTS

| | | |
|---|---|---|
| 1,037,605 | 8/58 | Germany. |
| 854,825 | 11/60 | Great Britain. |
| 873,112 | 7/61 | Great Britain. |
| 878,927 | 10/61 | Great Britain. |

OTHER REFERENCES

AEC Document TID 10001, April 1957, pp. 8–21.

Reactor Core Materials, vol. 2, No. 1, February 1959, pp. 22 and 23.

Nuclear Metallurgy, vol. VI, November 1959, pp. 87–94.

Nuclear Fuel Elements, by Hausner et al., November 1959, pp. 209 and 271.

Reactor Core Materials, vol. 3, No. 2, May 1960, page 12.

AEC Document NYO 9064, April 1961, pp. 5–1 through 5–18, 7–1 through 7–6.

CARL D. QUARFORTH, *Primary Examiner.*

OSCAR R. VERTIZ, *Examiner.*